United States Patent
Kannan et al.

(10) Patent No.: US 8,904,444 B2
(45) Date of Patent: Dec. 2, 2014

(54) SCALABLE DATA ACQUISITION AND ACCUMULATION IN A RESOURCE CONSTRAINED ENVIRONMENT

(71) Applicant: Motorola Mobility LLC, Libertyville, IL (US)

(72) Inventors: Navneeth N. Kannan, Doylestown, PA (US); Robert C. Booth, Ivyland, PA (US); David F. Brumbaugh, Collegeville, PA (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/677,576

(22) Filed: Nov. 15, 2012

(65) Prior Publication Data

US 2014/0137158 A1   May 15, 2014

(51) Int. Cl.
*H04N 5/445*        (2011.01)
*H04N 21/235*       (2011.01)
*H04N 21/482*       (2011.01)
*H04N 21/435*       (2011.01)

(52) U.S. Cl.
CPC ........... *H04N 21/482* (2013.01); *H04N 21/235* (2013.01); *H04N 5/44543* (2013.01); *H04N 21/435* (2013.01)
USPC .......................................................... 725/54

(58) Field of Classification Search
CPC . H04N 5/44543; H04N 21/435; H04N 21/84; H04N 21/235; H04N 21/482
USPC .......................................................... 725/54
See application file for complete search history.

(56) References Cited

U.S. PATENT DOCUMENTS

| | | | |
|---|---|---|---|
| 6,904,609 B1* | 6/2005 | Pietraszak et al. | 725/39 |
| 7,076,202 B1* | 7/2006 | Billmaier | 455/3.04 |
| 7,370,342 B2* | 5/2008 | Ismail et al. | 725/46 |
| 7,433,873 B2* | 10/2008 | Kang | 1/1 |
| 7,484,233 B2* | 1/2009 | Pietraszak et al. | 725/39 |
| 7,603,687 B2* | 10/2009 | Pietraszak et al. | 725/50 |
| 8,051,454 B2* | 11/2011 | Krikorian et al. | 725/94 |
| 8,255,531 B2* | 8/2012 | Bose et al. | 709/224 |
| 8,280,949 B2* | 10/2012 | Bergquist et al. | 709/203 |
| 8,302,127 B2* | 10/2012 | Klarfeld et al. | 725/46 |
| 8,458,613 B2* | 6/2013 | Oshiro et al. | 715/788 |
| 8,495,679 B2* | 7/2013 | Labeeb et al. | 725/46 |
| 2003/0046689 A1* | 3/2003 | Gaos | 725/34 |
| 2003/0067554 A1* | 4/2003 | Klarfeld et al. | 348/461 |
| 2003/0093792 A1* | 5/2003 | Labeeb et al. | 725/46 |
| 2004/0123319 A1* | 6/2004 | Kim | 725/53 |

(Continued)

*Primary Examiner* — Nasser Goodarzi
*Assistant Examiner* — Michael B Pierorazio
(74) *Attorney, Agent, or Firm* — Fish & Richardson P.C.

(57) ABSTRACT

A method of acquiring and accumulating data from a server via a network is provided. A request is transmitted for a plurality of items of data and includes at least one ingestion marker associated with the data. The at least one ingestion marker represents a last occurrence of when a change was made to the data. Data is received with a transfer protocol in response to the request. The data has at least one associated ingestion marker different than the at least one associated ingestion marker transmitted with the request. The received data and the at least one associated ingestion marker is stored in memory. The request is transmitted and the data is received and stored electronically by an electronic client device communicating with the server over the network. A system of acquiring and accumulating Electronic Program Guide (EPG) data from a web-server over a network is also disclosed.

16 Claims, 5 Drawing Sheets

(56) References Cited

U.S. PATENT DOCUMENTS

| | | | |
|---|---|---|---|
| 2004/0139480 A1* | 7/2004 | Delpuch et al. | 725/135 |
| 2005/0097605 A1* | 5/2005 | Itou | 725/45 |
| 2005/0177849 A1* | 8/2005 | Pietraszak et al. | 725/44 |
| 2005/0183116 A1* | 8/2005 | Pietraszak et al. | 725/40 |
| 2006/0047668 A1* | 3/2006 | Kang | 707/10 |
| 2006/0206912 A1* | 9/2006 | Klarfeld et al. | 725/40 |
| 2006/0212900 A1* | 9/2006 | Ismail et al. | 725/34 |
| 2006/0212904 A1* | 9/2006 | Klarfeld et al. | 725/46 |
| 2007/0112826 A1* | 5/2007 | Laksono | 707/102 |
| 2009/0106391 A1* | 4/2009 | Wang | 709/217 |
| 2009/0248700 A1* | 10/2009 | Amano et al. | 707/10 |
| 2009/0260038 A1* | 10/2009 | Acton et al. | 725/49 |
| 2010/0162305 A1* | 6/2010 | Downey et al. | 725/39 |
| 2010/0191860 A1* | 7/2010 | Krikorian et al. | 709/231 |
| 2010/0205636 A1* | 8/2010 | Coburn et al. | 725/46 |
| 2010/0223407 A1* | 9/2010 | Dong et al. | 710/70 |
| 2010/0287588 A1* | 11/2010 | Cox et al. | 725/40 |
| 2011/0116540 A1* | 5/2011 | O'Connor et al. | 375/240.02 |
| 2011/0126232 A1* | 5/2011 | Lee et al. | 725/39 |
| 2011/0161622 A1* | 6/2011 | Maeda et al. | 711/207 |
| 2011/0185387 A1* | 7/2011 | Schein et al. | 725/46 |

* cited by examiner

```
Begin:
    // First ingest titles;
    From (Today to the end of the rolling window)
        From (the most favorite channel to least watched)
            Get-Titles(day, channel, *all programs*)
        End
    End //next, get more data;
    From (Today to the end of the rolling window)
        From (the most favorite channel to the least watched)
            Get Moredata(day, channel, *all programs*)
        End
    End
End
```

*FIG. 7*

SCALABLE DATA ACQUISITION AND ACCUMULATION IN A RESOURCE CONSTRAINED ENVIRONMENT

BACKGROUND

Data in an electronic form often must be acquired and accumulated by an electronic client device or the like via transmissions across a network. Constraints on these acquisition and accumulation functions include available network bandwidth, access patterns with respect to frequency and time required of the data by a population of subscribers or client devices, economic issues such as a number of servers needed to support client devices of subscribers, and/or like issues.

By way of example, the network may be operated by a multiple systems operator (MSO) such as a service provider of terrestrial, cable or satellite digital TV, and the data may be for an Electronic Program Guide (EPG) or like service. A subscriber to a service provider of digital TV will typically have a monitor or television (TV) connected to a set top-box (STB) or like customer premise equipment (CPE). The STB is able to receive a multitude of TV channels from a broadcast head end of the network, and each TV channel may have a multitude of scheduled programs during a typical day.

STBs typically provide the subscriber with an EPG that enables the display of a listing of scheduled programs for a predetermined period of time and provides, among others, information about broadcast dates and times and content information. For example, the program attributes may include content information which describes the channel, title, time, actor, director, genre, language and the like for each program. Television viewers can navigate through an onscreen program guide to locate programming and browse or query the guide for currently available programming as well as schedules of programming available in the future.

A conventional EPG user interface (UI) lists multiple programs in a two-dimensional grid-like pattern or format with one dimension of the grid being a name of a channel that is broadcasting the specified programming and the other dimension being scheduled broadcast times. The length of the program block for a particular program appearing in the grid is typically proportional to the length in time of the program. Accordingly, a user is able to see what programming is available and when it is scheduled to start and end.

Program metadata of such guides is typically provided from a source, such as Tribune Media Services, mapped into a desired format, and ingested on a daily basis by a central database of a MSO. In typical so-called "legacy" systems, the updated data is carried on broadcast or multicast carousels which allow applications on the STBs to tune to the multicast via out-of-band receivers and obtain a complete set of new data on a daily basis for an entire rolling window of days of programming. Another potential approach for providing EPG data to STBs is via the use of web servers and browser-based web applications.

In a web-services model, the STBs or other client devices request (e.g., pull or fetch) the program metadata individually and build-up the memory in the set-top box for usage by a program guide application residing on the STB. This is accomplished via unicast communications to individual set-top boxes aiming to get the program metadata. If the client device obtains updates of metadata frequently, such as on a daily basis, latency associated with data retrieval can become unacceptable due to constraints of available network bandwidth, access patterns to the data requested by the client devices, and economics with respect to the number of servers needed to support the population of client devices.

BRIEF DESCRIPTION OF THE DRAWINGS

Various features of the embodiments described in the following detailed description can be more fully appreciated when considered with reference to the accompanying figures, wherein the same numbers refer to the same elements.

FIG. 7 is an example of pseudo-code for a client device defining an order in which program metadata is ingested by the client device in accordance with an embodiment.

DETAILED DESCRIPTION

Figure 1:
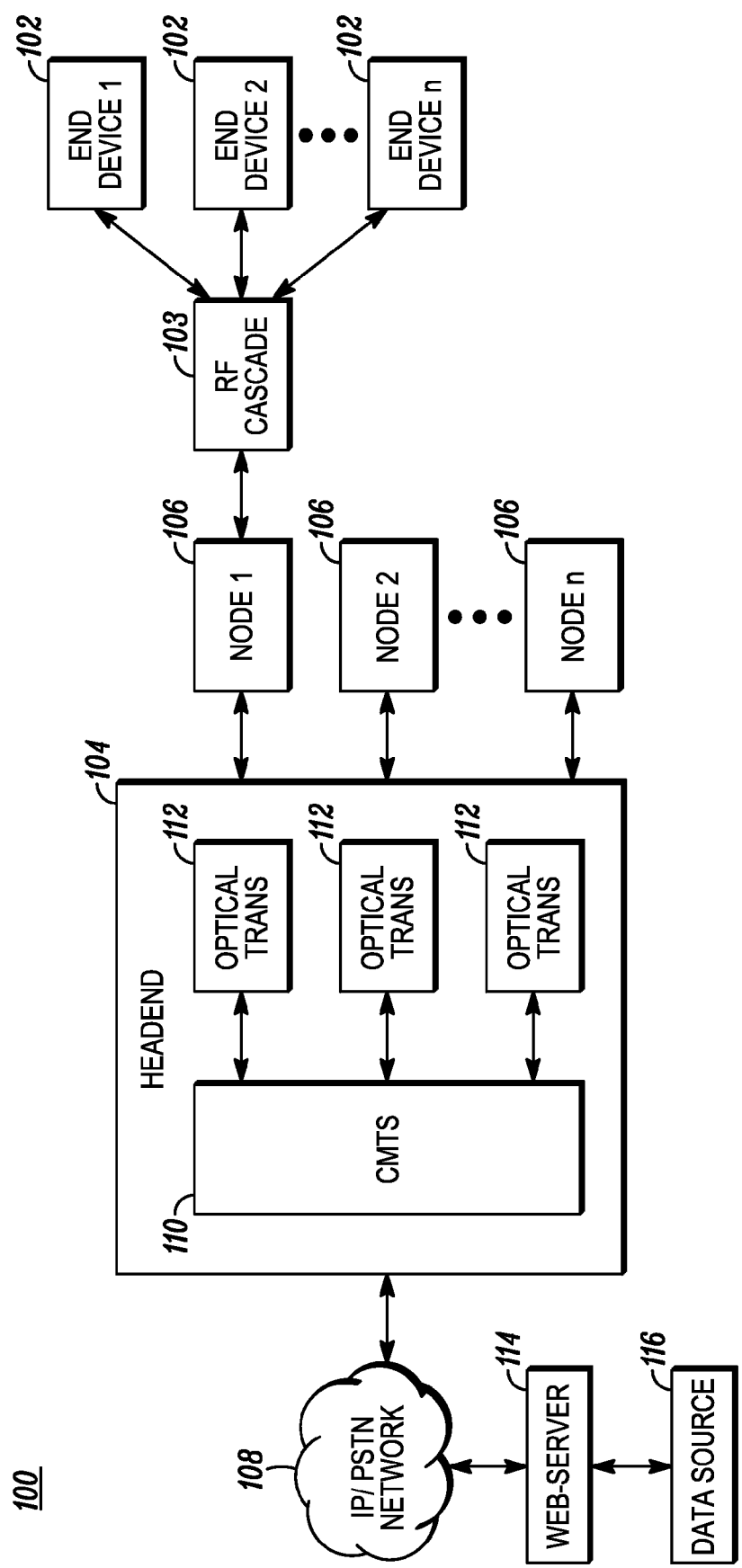
FIG. 1 depicts a network in accordance with an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to embodiments disclosed herein, a method of acquiring and accumulating data from a server via a network is provided. A request is transmitted electronically over the network from a client device to the server for a plurality of items of data and includes at least one ingestion marker associated with the data. The at least one ingestion marker represents a last occurrence of when a change was made to a particular subset of the data or to each item of data. Data is received by the client device from the server with a transfer protocol over the network in response to the request. The data transferred has at least one associated ingestion marker that is different and/or not equal to the at least one associated ingestion marker transmitted with the request. The data and the at least one associated ingestion marker received by the client device is stored in memory of the client device.

According to another aspect of this embodiment, a method of making Electronic Program Guide (EPG) data available to a population of set top boxes or like client devices via electronic communications over a network of a service provider of terrestrial, cable or satellite digital television is provided. A current set of EPG data for a rolling window of a predetermined number of days is obtained from at least one source by a server communicating with a headend of the network. The current set of EPG data obtained is compared to corresponding items of EPG data stored in memory to identify any changes in the items of EPG data stored in the server relative to the current set of EPG data obtained by the server. Each of the items of EPG data stored in the memory of the server includes an ingestion marker representing a last occurrence of when a change was made to the item of EPG data in memory. The items of EPG data stored in memory are updated with the changes and the ingestion markers associated with the items of EPG data changed are updated accordingly.

According to a further aspect of the embodiments, a system of acquiring and accumulating Electronic Program Guide (EPG) data from a web-server over a network is provided. The system includes a client device having cache memory in which items of EPG data and at least one associated ingestion marker associated with the items of EPG data are stored for a rolling window of days of scheduled programs. The at least one ingestion marker represents a last occurrence of when a change was made to the items of EPG data. The client device has at least one module for performing a Hyper-Text Transfer Protocol (HTTP) fetch of items of EPG data having a different ingestion marker than the ingestion marker stored in the cache memory and for updating the items of EPG data in cache memory with the items of EPG data having a different ingestion marker obtained with the HTTP fetch.

The use of web-services technologies on a network of a service provider of terrestrial, cable or satellite digital TV may be subject to various operational challenges that are not necessarily experienced on other types of networks. For instance, the availability of resources and the manner that data is consumed by a subscriber of such a service provider may create unique problems. It is desirable to avoid latencye associated with data retrieval for web-services, where such latency may be deemed unacceptable to subscribers.

An example cable network includes a headend that may provide access for several nodes to IP or ISPN networks and, for instance, web-servers. The headend typically interfaces with a communications device having several receivers, each connecting to numerous nodes that each connect to numerous network elements. A communications device such as a cable modem termination system (CMTS) is typically provided at the headend or hub site of a broadband network for providing high speed data services, such as Internet, Voice over Internet Protocol, or digital video services to subscribers of a cable TV operator or to like customers. The CMTS may host downstream and upstream ports and contain numerous receivers, each receiver handling communications between hundreds of end user network elements connected to the broadband network. For example, each CMTS receiver may be connected to network elements via nodes through which a single CMTS receiver may be connected to a plurality of network elements that vary widely in communication characteristics. In many instances several nodes, such as a fiber optic node, may serve a particular area of a town or city.

A network element may be a modem, e.g., cable modem, MTA (media terminal adaptor), set top box, terminal device, television equipped with set top box, Data Over Cable Service Interface Specification (DOCSIS) terminal device, customer premises equipment (CPE), router, or like electronic client, end, or terminal devices of subscribers. Cable modems and IP set top boxes may support data connection to the Internet and other computer networks via the cable network, and the cable network provides bi-directional communication systems in which data can be sent downstream from the headend to a subscriber and upstream from a subscriber to the headend.

The cable network may include a variety of cables such as coaxial cables, optical fiber cables, or a Hybrid Fiber/Coaxial (HFC) cable system which interconnect the network elements or client devices of subscribers to the headend in a tree and branch structure where terminal network elements (MTA, cable modem, set top box, client devices, terminal devices, end devices, etc.) reside on various optical nodes. The nodes may be combined and serviced by common components at the headend.

Each node may contain a reverse/return path transmitter that is able to relay communications from a subscriber network element to the headend. Downstream (also referred to as forward path) optical communications over the optical fiber are typically converted at the nodes to Radio Frequency (RF) communications for transmission over the coaxial cable. Conversely, upstream (also referred to as return path) RF communications from the network elements are provided over the coaxial cables and are typically converted at the nodes to optical communications for transmission over the optical fiber to the headend.

FIG. 1 illustrates an example cable network 100. The network 100 is an HFC network and includes network devices shown as end or terminal devices 102 at subscriber locations. The end devices 102 may be Data Over Cable System Interface Specification (DOCSIS) devices, such as cable modems (CMs), modem terminal adapters, MTAs, STBs, and embedded cable modems of DOCSIS set-top gateways (eCMs of DSGs), or any other like client device. The term DOCSIS refers to a group of specifications that define industry standards for cable headend and cable modem equipment.

The end devices 102 are shown connected to a headend 104 of the network 100 via nodes 106 and an RF cascade 103 which may be comprised of multiple amplifiers and passive devices including cabling, taps, splitters, and in-line equalizers. The headend 104 connects to an IP (Internet Protocol) and/or PSTN (Public Switched Telephone Network) network 108. Data, such as TV programs, audio, video and other data, which may be from the network 108, is sent from the headend 104 to the end devices 102. In addition, the end devices 102 may send data upstream towards the headend 104. Although not shown, each of the nodes 106 may be connected to multiple end devices.

As illustrated in FIG. 1, the headend 104 includes a CMTS 110 and optical transceivers 112 which provide optical communications to and from the CMTS 110 through optical fiber to the nodes 106. Typically, the nodes 106 connect to the headend 104, and the headend 104 contains a plurality of CMTS units 110. Each CMTS 110 contains a plurality of transceivers, which communicate with the plurality of end devices 102. For example, each CMTS 110 may have eight, forty-eight or more transceivers, and each transceiver may communicate with hundreds or more of end devices 102.

The optical transceivers 112 may contain both a downstream optical transmitter and an upstream optical receiver. The optical transmitter at the headend may convert received electrical signals to downstream optically modulated signals that can be transmitted to the nodes. The optical transceiver 112 may provide optical communications with nodes 106 via optical fiber, where fiber optics may extend from a headend to a hub and/or to a node 106, such as a fiber optic node. Each node 106 may be connected to many network elements 102 of subscribers via a coaxial cable portion of the network represented by the RF cascade 103. Each node 106 may include a broadband optical receiver to convert a downstream optically modulated signal received from the headend/hub to an electrical signal provided to the subscribers' network elements 102 via the coaxial portion of the HFC network.

According to an embodiment, a web-server 114 is shown in FIG. 1 and may function to provide EPG data to end devices 102. The web-server 114 may be a MSO-hosted server which may or may not be located at the headend 110. However, the web-server 114 communicates with headend equipment for purposes of making data available to end devices 102 via communications across the network 100. The web-server 114 may obtain data from one or more sources, providers or services, such as source 116 shown in FIG. 1.

A problem that can be experienced with the use of web-based services as shown in FIG. 1 with a traditional cable network is that such networks having DOCSIS (or DSG) capability typically may have limited bandwidth allocated for two-way data traffic on in-band channel destined for STBs and like client end devices. For instance, a hub-site served by a CMTS supporting a set-top population of about 25,000 may be allocated with just 10 megabits per second (Mb/s) for all downstream IP Traffic. Another problem is that even if the network bandwidth is plentiful, there is a constraint with respect to the number of web-based servers that can be installed at the headend or other location to support set-top clients. Portal services are restful in nature, and hence can architecturally scale, but the licensing costs and the physical server costs, including both fixed and operational costs such as power consumption, add up and constitute a practical economic barrier.

Still further, Internet data access is generally bursty and random. However, traditional video subscriber data access patterns across a cable network is generally not bursty and random; rather, it is more deterministic. This may be due to many factors as described below.

Broadcast of programs whether through network channels or cable channels is the primary form of video distribution. Consequently, subscribers "tune" into the broadcast channels and have an expectation of wanting to understand what is being offered and when. Thus, television program viewing is a synchronized, prime-time activity, and this is a direct consequence of the broadcast nature of the programs. A secondary reason for the existence of prime-time relates to a time after a typical work day when a typical subscriber is most likely to relax and view television programming content.

Synchronized viewing of content necessarily leads to associated synchronized data activity. For instance, there is a tendency for subscribers to "surf" or "find out what else is available" during specific times, such as the top of the hour and the bottom of the hour, when program content transitions occur and during the display of advertisements when the viewer has a motivation to "find out what else is available". Viewers of television programs also have a tendency to favor some programs and channels more than others and expect to have detailed information about certain channels and or program genres.

In a web-services model for providing data, such as EPG data, to STBs, the client end devices must individually request the program metadata for purposes of building-up the memory in the set-top box for subsequent usage by program guide applications running on the STB. As discussed above, this is accomplished in a web-service model via unicast transmissions to individual set-top boxes aiming to get the program metadata. A transfer protocol used to download such data, for instance, may be Hyper-Text Transfer Protocol (HTTP), and the STBs may perform HTTP fetches or gets to obtain the data. If the population of client end devices adopts this approach and seeks to obtain updated metadata daily, the constraints cited above will lead to problems such as latency of data acquisition and accumulation by the client end devices.

As an illustrative example of such constraints and problems, a typical hub-site having a CMTS serving a DOCSIS network to which set-top boxes are connected and configured for two-way traffic may serve about 25,000 set-top boxes and have a total bandwidth of 10 Mbps allocated for set-top traffic. EPG metadata for a typical line-up can be up to about 30-MBytes. Given a data compression ratio of about 6:1, approximately 5 MB of data is required to be transferred per set-top box in this example. For a population of 25,000 set-tops in a hub, this represents 25K×5 MB=125 GBytes. Thus, it will take more than 25 hours for the entire population of 25,000 set-top boxes to ingest all the data using a full 10 Mbits/second for traffic. This, of course, requires more time than there is to pick up the next day's data and is therefore unacceptable. Further, not all of the 10 Mb/sec referenced above for traffic will typically be allocated to the application, and worse, just for EPG data. Thus, as explained above, the web-based model is subject to limitations on cable networks.

Assuming a 10 Mb/sec full-allocation for the EPG data in the above example, the number of STBs that can be supported in a time period from the initial ingestion of daily data to an acceptable period by which the data will be made available for all the set-top boxes can be determined as follows. Given the ingestion into the MSO's hosted database will be accomplished by about 11 AM daily, this leaves about 6 hours before the 5 PM early start of prime TV watching period by subscribers. Using the same numbers as in the above example, only about 5,000 STBs per hub can be supported (which corresponds to 20,000 STBs being unsupported in the example). However, if the allotted bandwidth is dropped by about 25%, the number of supported homes per hub is further reduced to 1,250 STBs which clearly represents an unacceptable take rate.

Since increasing the bandwidth for downstream traffic does not represent an economically practical and viable solution, it is not a desirable solution in a web-based model that each STB (or like device) of a large population of STBs (or like devices) invalidates a current or previously received data set and replaces it every day with an entirely new data set. Thus, in an embodiment proposed herein that uses an approach for providing EPGs to STBs via the use of web servers and browser-based web applications, the STBs function to individually fetch or pull only changes in the data set, as opposed to pulling all the data for a rolling window of days of data each day. Such a solution may address each of the constraints cited earlier, Accordingly, each individual item or defined subset of items of data last obtained and currently residing in the memory of the STB may be permitted to remain valid for an extended period of time beyond that of day or the next fetch or pull of data. But, each item of data currently stored in the memory of the STB may be replaced, changed, modified, or deleted according with an embodiment where each item of data currently stored in the memory of the STB is replaced, changed, modified, or deleted only when such item of data is invalidated due to an actual change, modification or deletion of the item of data.

Thus, each item of metadata stored by the STB may be updated, replaced, modified or otherwise changed only when the item itself is subject to a change, as opposed to invalidation and replacement on a daily basis. Accordingly, a data acquisition model utilized is one based on demand-correlated data acquisition similar to an Internet data access model, yet is still able to overcome one or more of the of the above referenced constraints experienced by service providers of terrestrial, cable or satellite digital TV as discussed above.

In an embodiment, EPG data may only traverse a network for updates as a result of a supplemental fulfillment of changes or anomalies to the data, in contrast with the current model where all data is completely replaced each time a retrieval of data from the EPG (e.g., EPG "push") is scheduled. The result may be a better management of the existing network bandwidth. For example, traditional methods of identifying differences for internet protocols, where data is pulled via HTTP, do not work. The disclosed embodiments mark during ingestion, allowing the STB to inquire regarding what has changed without negating the effects of server-side caching of HTTP servers.

The nature of the data and the specific usage patterns of EPG data on a cable network is a consideration. Certain characteristics of the metadata as well as the subscriber behavior patterns may be taken into account to provide a level of viewing experience that is acceptable to subscribers while also working within the constraints of cable networks discussed above. For example, when handling metadata associated with an EPG guide, metadata generally does not vary greatly on a day-to-day basis. It is typical for a MSO to receive a fresh set of program metadata every day for a rolling window, typically a 14-day rolling window. The data is converted from the source format to a desired internal format and prepared for delivery. Fresh data for the new 14th day is received every day and replaces data corresponding to the day that just passed, and there are inevitable updates to the existing data as well.

Figure 2:
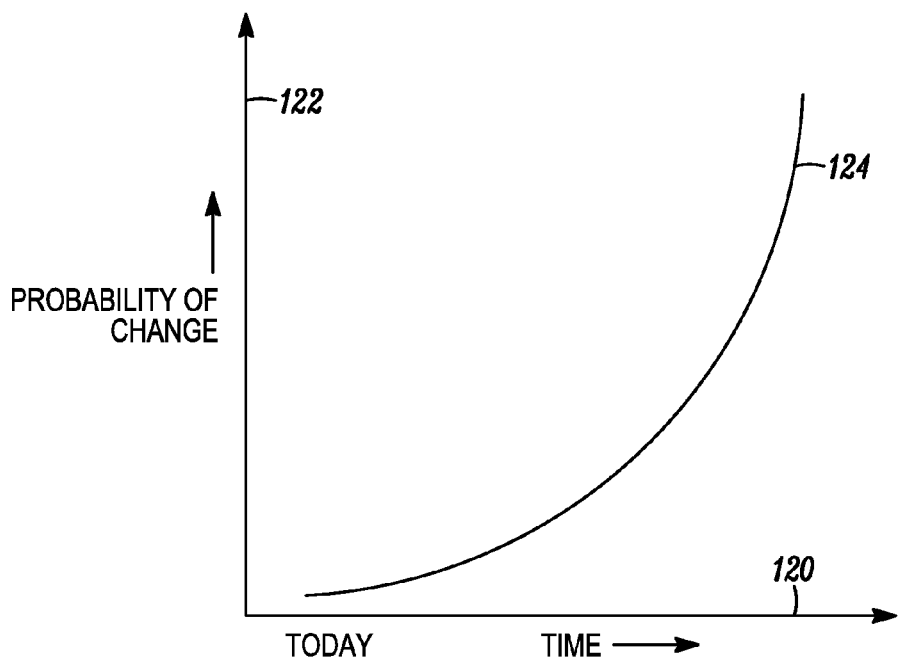
FIG. 2 is a graph depicting the relationship of probability of change of program metadata over time in accordance with an embodiment.
Figure 3:
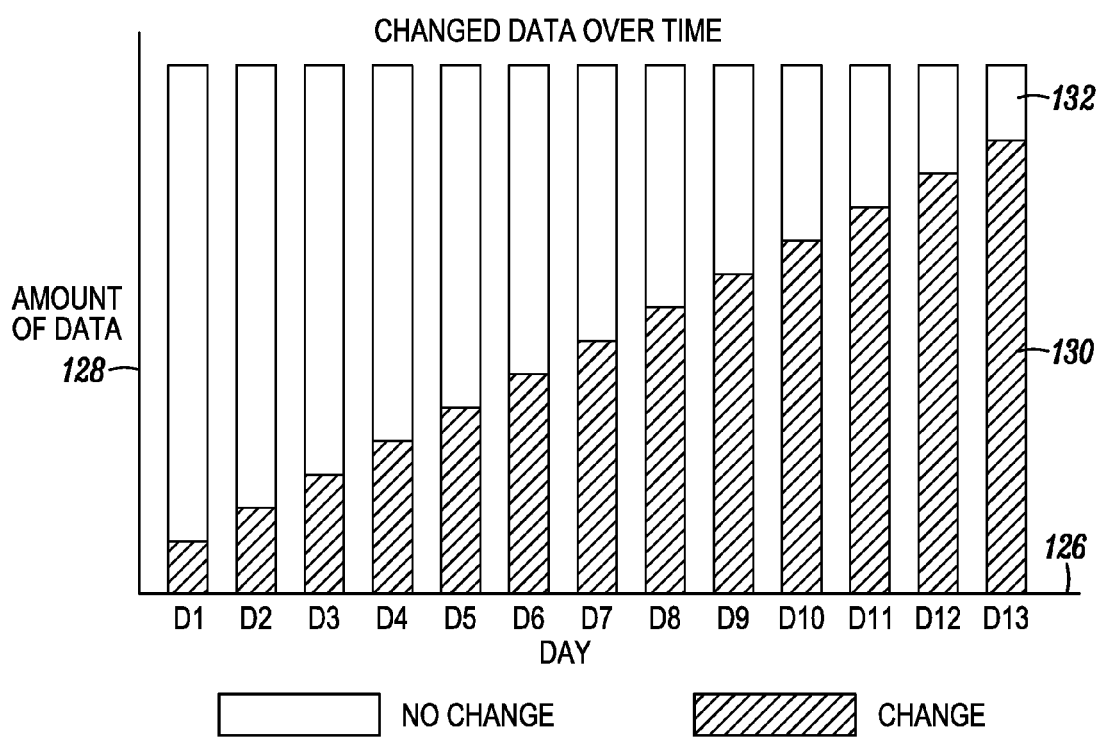
FIG. 3 is a graph depicting the relationship of changes of program metadata over a rolling window of days in accordance with an embodiment.

In general, the probability of data being updated is proportional to the uncertainty of the program line up for any particular channel. While real-time events such as sporting events and political events can certainly dictate potential random updates, most of the uncertainty is proportional to how far into the future from the vantage of current day that something could change. This relationship can be shown by way of the diagram in FIG. 2 in which the x-axis 120 represents time, the y-axis 122 represents probability of change, and the curve 124 reveals that the probability of change increases for data further out in the future within the rolling window. For example, the chart of FIG. 3 provides a typical data set for a set of rolling 14-day data. The x-axis 126 represents the days, the y-axis 128 represents the amount of data, the lower section 130 of each bar shown in the diagram represents the amount of modified data for the day and the upper section 132 of the each bar represents the amount of unmodified data. In the chart, the 14th day is not shown, since in a 14-day rolling window, 100% of the data for the 14th day will be new. The chart of FIG. 3 indicates that about 50% of the overall data has changed, although mostly within days further out in the future within the rolling window.

Based on the above, an embodiment disclosed herein for data acquisition of EPG data may require that data acquisition be limited to changed or modified data, as opposed to the entire data set. The limited changes/modifications may greatly reduce the amount of data that needs to be acquired on a daily basis by each STB, the need for bandwidth, and the need for resources to support this activity. The embodiment would only require the software modules of the web-servers and client end devices to accommodate requesting, transmitting, fetching, downloading, and receiving with respect to items or defined subsets of data that have actually subject to a change, modification, deletion or addition.

According to an embodiment, the web-server 114 of the network 100 that ingests data from the metadata source 116 identifies differences between the previous data set currently stored on the web-server 114 and the data set that is currently incoming from the source 116. At the lowest level of granularity, metadata is associated with a given program. If any of the attributes of the program has changed, this constitutes a change. If the program itself has been removed, this also constitutes a change as will the new program added in its place. Thus, the web-server 114 identifies each program and each item of metadata for a given program as one of: unchanged; new; modified; or deleted. This task may be identified globally; thus, it can fall to the server 114 for efficiency purposes. The concept of a change is always relative to the previous ingestion point. As a special case, the first time the server ingests the data all the changes would be recorded as "new".

Figure 4:
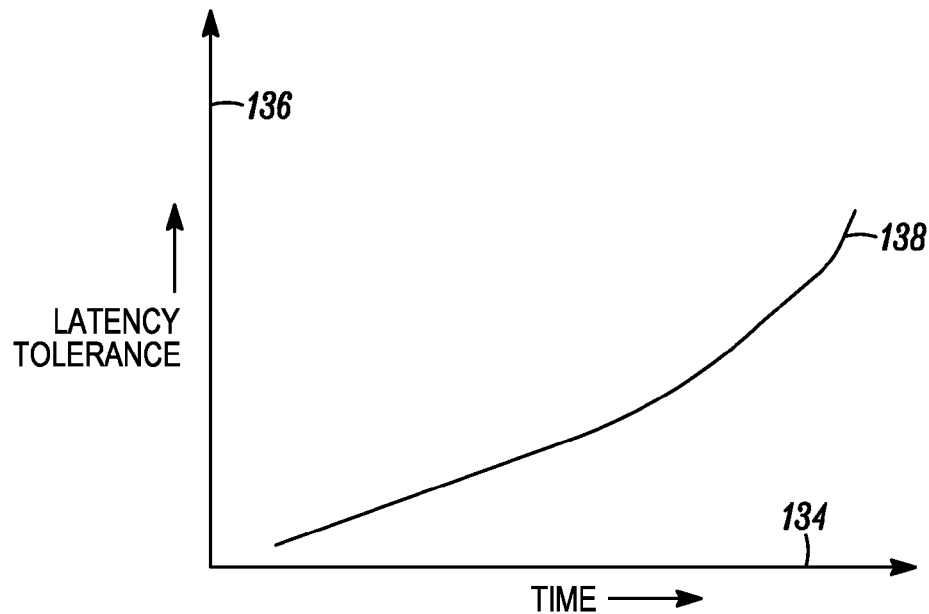
FIG. 4 is a graph depicting the relationship of subscribers tolerance for latency with respect to acquiring program metadata relative to programs scheduled over time in accordance with an embodiment.

Another characteristic unique to a cable network is that viewer expectation of data availability for a given channel is stringent for the present and relaxes over time. As an example, when the viewer looks at the grid guide data, he/she would expect the metadata for programs for any channel to be available without any delay for the current time and time slots closely following the current time. However, the subscriber likely will have a greater tolerance for delay in data availability for programs scheduled a day or more in advance. This relationship is shown in FIG. 4. The x-axis 134 represents time, the y-axis 136 represents tolerance of viewers to latency, and the curve 138 shows that the tolerance of latency increases with respect to metadata for programs scheduled in the distant future.

Accordingly, an algorithm that may be used by a client end device according to an embodiment may take the above relationship into account and ensure that the data for the current time and the next few days is available and ready for immediate consumption. However, there is a more relaxed requirement on acquiring changes to the data for the days further out in the future within the rolling window, such as days ten to fourteen, for instance.

Figure 5:
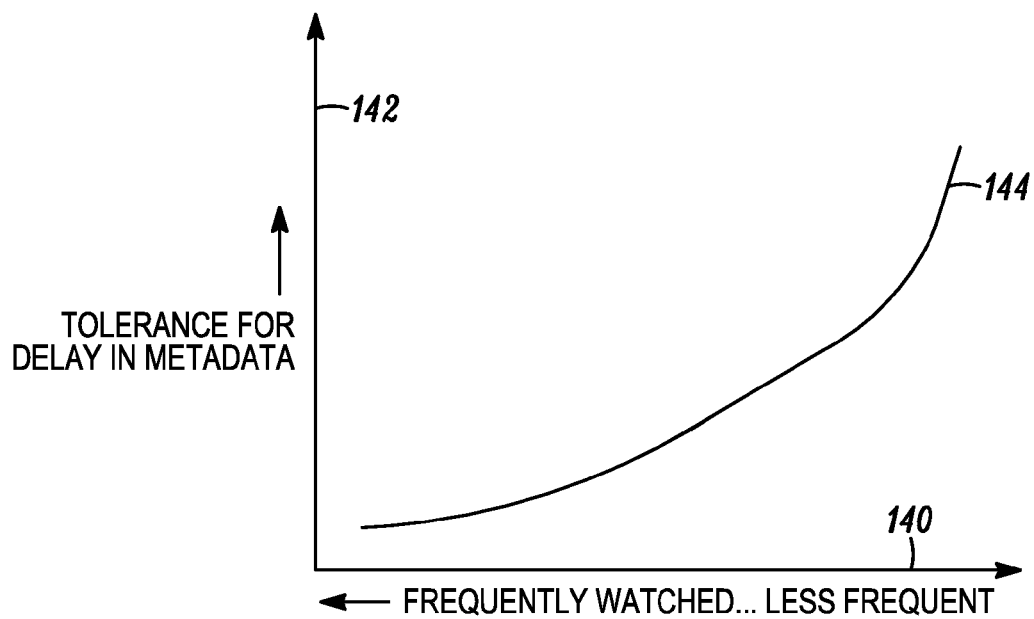
FIG. 5 is a graph depicting the relationship of subscribers tolerance for latency with respect to acquiring program metadata relative to programs frequently watched versus programs less frequently watched in accordance with an embodiment.

In addition, a viewer will likely expect data with low latency for channels that are considered favorite channels or for more frequently watched channels. Thus, the expectation for metadata of favorite channels may be immediate (i.e., low latency), whereas the tolerance of delay for data associated with channels that are not favorite or are not watched frequently may increase. This relationship is shown in graph form in FIG. 5. The x-axis 140 represents how frequently a channel/program is viewed by a particular subscriber, the y-axis 142 represents the tolerance of viewers to latency for metadata, and the curve 144 shows that the tolerance of latency increases with respect to metadata for channels and/or programs that are less frequently viewed by the viewer. The term "favorite" as used above refers to the set of channels and/or programs that include the channels that are explicitly declared to be favorite using a favorite-channel feature and to the set of channels and/or programs that is based on viewage statistics.

Accordingly, in an embodiment disclosed herein, the EPG client device may perform the following operations: (i) keep track of the favorite channels that are explicitly created by the user; (ii) keep track of viewage statistics to build information on the channels that are frequently watched; and (iii) request data in a manner that gives priority to the build-up of data that satisfies the favorite and more frequently watched channels before other channels (i.e. non-favorite).

In addition, data is considered changed or modified not only when the day and time slot of the program has been altered, but also when any metadata or information relating to the program has been changed, updated, or modified. For this purpose, an ingestion marker is used to represent the last ingestion that changed some aspect concerning a given set of information. The marker can be a monotonically increasing marker that is part of the global variable space within a system that includes a server and multiple clients.

At the lowest level of granularity, the association of the ingestion marker can be with respect to a given program. However, at higher level groupings, ingestion markers can be with respect to "view sets". An example of a view set may be the set of all programs for a given channel on a given day. An example of another view set may be the set of all programs for a given day. These examples represent two "view sets" of the program data that can be associated with an ingestion marker.

Figure 6:
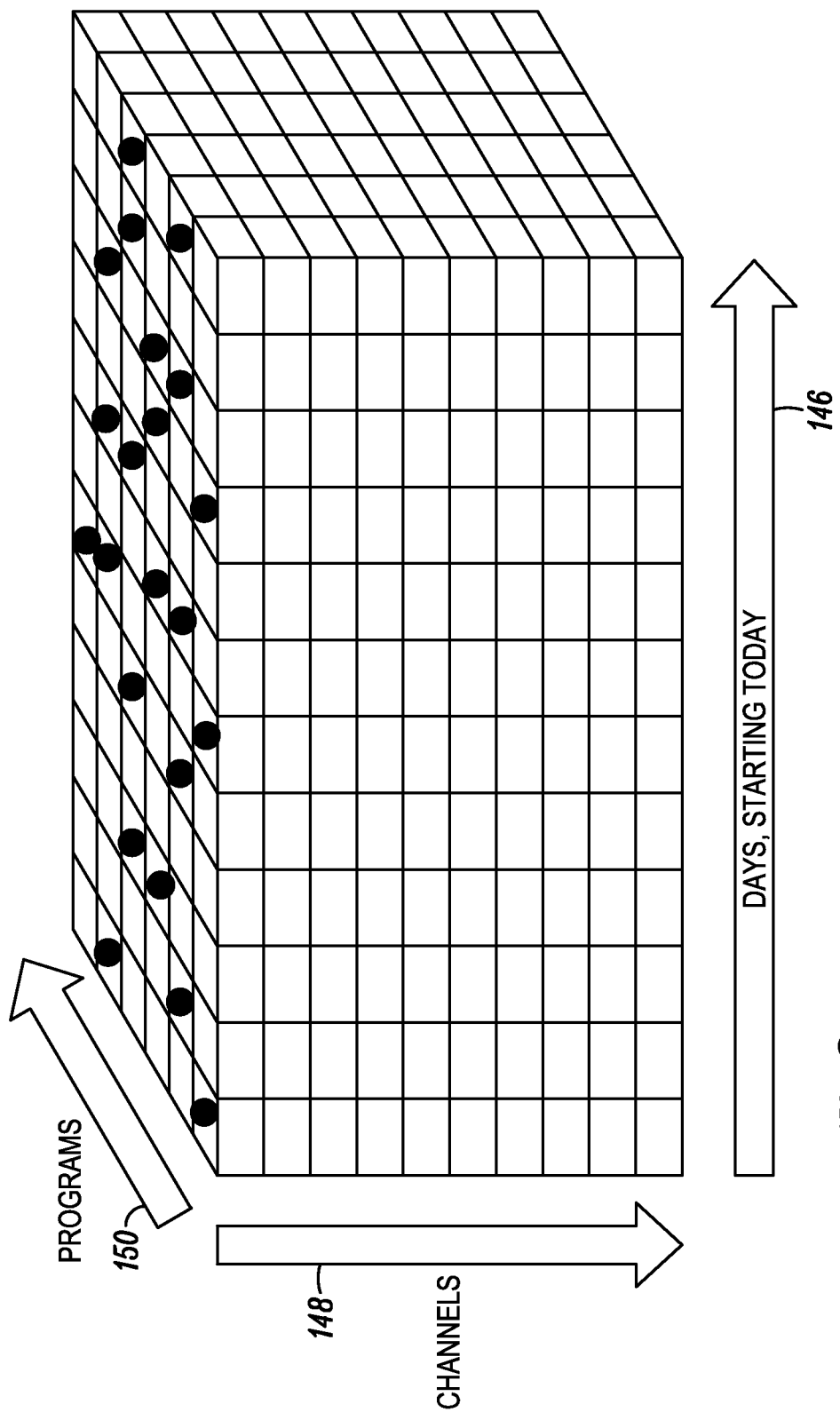
FIG. 6 is a view of program metadata for programs by channel and by day and time slot with programs having changed program metadata identified in accordance with an embodiment.

A data view is shown in the diagram of FIG. 6 which is representative only. There may be changes to multiple programs in other channels than that shown in FIG. 6; however, these changes are not identified in FIG. 6 simply due to diagram limitations. In FIG. 6, the x-axis 146 represents days in the rolling window, the y-axis 148 represents the channels, and the z-axis 150 represents the programs. Thus, for the channel represented on the top of the graph, a marking 152 indicates that a change has been made to the metadata for each of the marked programs. Although FIG. 6 illustrates a graph having only three dimensions (i.e., x, y and z axis) for the information above, additional dimensions can also be used with a vector representing the level of metadata information. For example, the title of the program alone could constitute the minimal information for a dimension; while, poster art, detailed description, cast, reviews, twitter comments, etc. can represent additional information in the dimension or other dimensions.

According to an embodiment, "Program Information" (PI) can be defined and represented as a function of (Channel, Day, Time-slot, and Level-of-metadata). For example, this can be represented as an equation, as follows:

$$PI = \sum_1^{levels} Info * \sum_1^{C} Chan * \sum_1^{Window} Days * \sum_1^{P} Program$$

This (PI) would represent the entire data set.

A "View Set" (VS) is defined as a subset of PI and may be a subset of information that is of interest to a given client. Any given View Set may be generated by constraining the information window (i.e., data for one channel, data for the 4 hours of interest, data for the one channel for the 4 hours of interest, etc.). Here, the view set is recognized by the server based on requests for data made by the population of client devices. Consistency in view-set requests can result in efficiency of response, due to caching of data.

Each Ingestion Marker for a program or for a view set is configured with a starting value and then is monotonically increased, every time the server ingests data from an external source. As a practical example, if the TMS (Tribune) data is sourced and taken in every day, the Ingestion Marker at most may increment by one each day. The marker provided by the source can be referenced as a "Current Ingestion Marker" to differentiate it from markers that represent earlier ingestion points. Upon ingestion of data from the source 116, the web-server 114 identifies all the programs that have changed and updates the ingestion markers for only the programs that have changed with the current ingestion marker. If any programs have not changed, their ingestion markers in the memory of the web-server are left unchanged.

The client devices requesting program information (such as via a HTTP pull, fetch or get) forward information with respect to an ingestion marker associated with the requested program or view set. This would be the ingestion marker that was received by the client device with a previous data pull the last time the program or view set had a change. If a client device is populating the data for the first time, then the value sent by the client device will be NULL.

The web-server responds to requests from client devices for program metadata with the program metadata and an ingestion marker for the program. However, this occurs only when the program metadata for the program has changed or is new. On the other hand, if the incoming ingestion marker from the client device matches and/or equal to the ingestion marker for the data currently stored by the web-server, then a simple message stating that the data remains valid is sent to the client device in response to the data pull attempt. From the perspective of the client device, the value of the ingestion marker has no real meaning (i.e., the client devices do not interpret the markers).

While ingestion markers may be associated with programs, ingestion markers may also be associated with abstract views or view sets as discussed above. For example, for a view set consisting of the complete program line-up for a given channel on a given day, each ingestion marker for a program scheduled for the channel on the given day can be associated with such a defined view set. Here, if any of the programs in the view set has changed for that channel on that day, then the ingestion marker of the view set is updated.

View-sets can be dynamically managed, and the most often used view-sets can have the data stored with them. For instance, a view set defined as the channel 4 lineup for November 15$^{th}$ is valid for the duration of the rolling window. For instance, for a 14-day window, the first time that data is ingested for November 15$^{th}$ (including for Channel-4) would have been on November 2$^{nd}$. The data necessarily will become invalid on November 16$^{th}$.

View sets can represent standard entries like the one discussed above for channel 4. Another example is a view set defined as the channel line-up for a selected group of channels on a given set of days. In this case, there will be C×D (number of Channels×number of Days) of programs in the view set. View-set to ingestion marker mapping is dependent on the data of the underlying set. Mathematically, the ingestion marker for a view set is the maximum value of any ingestion marker for any of the individual programs within the view set. This allows a requesting client device to know that some data within the requested view-set has changed.

As another example, a view set can have four variables such as Channel, Day, From Time, and To Time as a generic entry for representing potential change. Thus, even in this case, only a small database may be required to represent view-set ingestion markers. Given that the ingestion marker for the view set can be dynamically calculated, there is no need to separately store that information in the database of the client device. Rather, when the client device requests a particular view set, it sends the lowest value of ingestion marker for any of the program data that is being requested within the view set. The server will then assess the ingestion marker for the view set based on its database and arrive at the maximum value. If the two ingestion markers match, then there is really no change, and the response is sent back indicating so. However, if the current ingestion marker of the server is different or more than the one sent by the client device, the data for the view set is sent to the client device along with the current ingestion marker.

The use of view sets enables client devices to request and receive only relatively small chunks of data, rather than requesting huge arbitrarily large view sets or the entire data set for a 14 day rolling window. When a client device receives the data for the view set, it does not have to invalidate the entire set of data locally stored and associated with the view set. If it is more efficient to update only the changed data, then it performs this function. However, if it is easier or more efficient to change out the entire data for a view set, this can also be accomplished by the client device.

For cache efficiency, the view-sets can be standardized, if desired. For example, if the granularity of a line-up set for a given channel for an entire day is considered too large, then the day can be divided into more manageable groups of data (i.e., AM time; Mid-day; Prime time; Late Hours). If multiple client devices ask for a given view-set, then the responses will cache well at the server side.

Population of the EPG data for a client device for a view set can proceed in a manner that takes into account the data usage as discussed previously with respect to favorite channels or programs of the viewer. For example, instead of requesting information concerning the channels within a view set based on a linear sorted order of channels, the client device can be configured to first request information or metadata for the most frequently viewed and/or favorite channel lists within the view set. The client device will need to maintain the most frequently watched and/or favorite channel list. Further, instead of requesting all days of a view set, the request or pull can be for the current day and thereafter for later days. Still further, instead of requesting all metadata for a view set, the client device can be configured to request/pull only titles first, and then follow with the other data. In this way, the data is requested/ingested in smaller chunks by the client device.

By way of example, a typical 14-day window may have about 25,000 programs in total. Assuming a linear relationship, this may translate to about 2,000 programs per day. If there are 100 channels, then this would correspond to roughly 20 programs per day per channel. Assuming that titles and other information is requested, this would require about 1K per program, or 20K per large request (that is amenable to cache). An example of a suggested "walk" for ingestion of data by a client device is portrayed in the pseudo-code 154 shown in FIG. 7. In this code, the client device first ingests titles of programs for the favorite channels, then ingests titles for the remaining channels, then ingest other metadata for the favorite channels, and then ingest other metadata for the remaining channels in the above sequence.

Of course, in the above example, it is assumed that the entire data set can be taken and stored in the cache of the client device. However, this is typically not the case in practice and there is typically insufficient memory in the client device to store information concerning all programs for all channels and for all days of the rolling window of data. Accordingly, the above example can be modified to have limits with request to cached data. For instance, the rolling window from the standpoint of the client device can be reduced, such as to 3 days instead of 14 days and/or the channel line-up can be reduced to half of the available channels based on usage statistics.

Further, the tradeoff with respect to keeping the entire EPG database locally in memory of the client as opposed to the memory requirements can be addressed by taking a split-cache approach. If the entire data can be stored in the local cache, then there is no issue. However, if the cache of the client device can only store a subset of the entire data, then a unified cache cannot be realized. Still further, the probability of invalidation of sections of the cache increases, even with stray accesses by the subscriber to areas of the database that are highly temporal in nature. As an alternative approach, a two-tiered cache can be used.

For example, if it has been concluded via analysis that the memory of the client device is sufficient for 3-days of data, then the cache could be split into two portions, with one tier for the first two days kept as sticky cache that gets invalidated only upon true expiration of time or data. The remaining memory is kept as a cache, and is subjected to the normal rules of cache invalidation based on usage. Instead of splitting based on 'days', the split cache may also be accomplished based upon a percentage of memory allocation to the different tiers. Expiration of time will force the client device to update the sticky cache with data from the other part of cache (if available) or request from the server. An advantage is that a higher-degree of determinism is associated with the most current data, and future data is permitted to be managed as per data usage.

Accordingly, a method of acquiring and accumulating data from a server via a network can include the following steps. A request or pull for a plurality of items of data can be transmitted from the client device to the server. The plurality of items can be a plurality of programs or a view set of programs as described above. The request includes at least one ingestion marker associated with each program or with each view set, and the at least one ingestion marker represents a last occurrence of when a change was made to the program metadata or program metadata for a program within the view set. The client device received or ingests program metadata from the server via a transfer protocol in response to the request, and the data has at least one associated ingestion marker which is different or unequal to the at least one associated ingestion marker transmitted with the request/pull by the client device. The client device then stores the program metadata and the at least one associated ingestion marker received while permitting program metadata stored in the client device corresponding to programs not subject to a change to remain undisturbed in memory.

The data may be Electronic Program Guide (EPG) data that includes information concerning scheduled programs. For instance, for each scheduled program, the plurality of items of program metadata may include channel information, title information, date information, time slot information, and metadata concerning other attributes of the scheduled program (i.e., language, summary, actors, genre, etc.). The client device may be a set top box or like customer premise equipment, and the network may be a network of a service provider of terrestrial, cable or satellite digital television.

The program metadata ingested by the client device is received in the form of a unicast transmission across the network from the server to the client device, and the transfer protocol can be Hyper-Text Transfer Protocol (HTTP). Further, the plurality of items of data in the request may be a subset (i.e., a view set) of a set of data stored in the memory of the client device. Thus, if the view set is subject to a change, only all or some of the program metadata falling within the view set needs to be updated in the memory of the client device. In addition, a view set may have a single ingestion marker associated therewith and transmitted to the server by the client device. Alternatively, each program may have its own ingestion marker that is transmitted to the server from the client device. The view set may be limited with respect to at least one of channel, day, and time slot and/or to at least one of a set of favorite channels and a set of channels identified based on viewer usage statistics. For this purpose, the client device may monitor viewer usage statistics to maintain a list of most-frequently watched channels.

From the standpoint of the web-server, a method of making Electronic Program Guide (EPG) data available to a population of set top boxes via electronic communications over a network of a service provider of terrestrial, cable or satellite digital television may include obtaining a current set of EPG data for a rolling window of a predetermined number of days from at least one source and comparing the current set of EPG data obtained to items of EPG data stored in memory to identify changes in the items of EPG data relative to the current set of EPG data. Each of the items of EPG data stored in memory includes an ingestion marker representing a last occurrence of when a change was made to the item of EPG data in memory. The server updates the EPG data in memory and updates the ingestion marker associated with the items of EPG data that were changed from a previous ingestion of data to indicate that a change was made to a particular program as of the latest ingestion of data.

The web-server also will receive requests or pulls from client devices for transfer of EPG data. Each request will include at least one ingestion marker associated with programs or view sets being requested such as one ingestion marker for each program or for each view set. Thereafter, program metadata for any program and/or view set having changes will be transferred via a transfer protocol to the client device with an updated ingestion marker.

A system of acquiring and accumulating Electronic Program Guide (EPG) data from a web-server over a network includes a client device having cache memory in which program metadata for each program in a rolling window of EPG data and an ingestion marker associated with each program and/or view set are stored. The client device has at least one module for performing a Hyper-Text Transfer Protocol (HTTP) fetch of program metadata having a different ingestion marker than the ingestion marker stored in the cache memory and for updating the program metadata in cache memory with the program metadata having a different ingestion marker obtained with the HTTP fetch. The HTTP fetch of program metadata can be limited to a subset (i.e., view set) of a set of data stored in the cache memory of the client device, and the view set can have a single ingestion marker associated therewith. The data obtained by the HTTP fetch consists only of program metadata of a program or within a view set having an associated ingestion marker different than the associated ingestion marker currently stored in the cache memory of the client device. The client device keeps track of favorite or most watched channels of the subscriber and requests or pulls program metadata for such channels before pulling similar data for other channels.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

It will be understood by a person having ordinary skill in the art that the conventional term "set-top box" should not be construed to limit the physical placement or configuration of such a device; for example, a set-top box is not limited to a device that is enclosed in a box, nor is it limited to a device positioned on top of a television set.

In addition, the above referenced devices, servers, components, sources, equipment, boxes, tuners and the like for carrying out the above methods can physically be provided on a circuit board or within another electronic device and can include various processors, microprocessors, controllers, chips, disk drives, and the like. It will be apparent to one of ordinary skill in the art that the processors, controllers, tuners, units, managers, rebuilders, and the like may be implemented as electronic components, software, hardware or a combination of hardware and software.

One of ordinary skill in the art appreciates that various modifications and changes can be made without departing from the scope of these embodiments as defined in the appended claims.

We claim:

1. A method of acquiring and accumulating data from a server via a network, comprising the steps of:
   transmitting a request for a plurality of items of data, the request including a first of one or more ingestion markers associated with the data, the first ingestion marker representing a last occurrence of when a change was made to the data;
   receiving data via a transfer protocol in response to the request, the data having at least one associated ingestion marker different than the first ingestion marker transmitted with the request; and
   storing the data and the at least one associated ingestion marker received during said receiving step in memory;
   wherein said transmitting, receiving and storing steps are performed electronically with an electronic client device communicating with the server over the network,
   wherein the data is Electronic Program Guide (EPG) data including information concerning scheduled programs and wherein, for each scheduled program, the plurality of items is program metadata including channel information, title information, date information, time slot information, and other metadata concerning the scheduled program.

2. A method according to claim 1, wherein the client device is a set top box and wherein the network is a digital television network, wherein digital television is at least one of terrestrial, cable or satellite television.

3. A method according to claim 1, wherein the data received during said receiving step is received via a unicast transmission across the network from the server to the client device, wherein the server is a web-server, and wherein the transfer protocol is Hyper-Text Transfer Protocol (HTTP).

4. A method according to claim 1, wherein the plurality of items of data in the request is a subset of a set of data stored in the memory of the client device, and wherein said storing step includes updating the set of data stored in the memory such that only a subset of the set of data is replaced in the set of data.

5. A method according to claim 4, wherein the plurality of items of data comprises a view set having a single ingestion marker of the one or more ingestion markers associated therewith transmitted with the request.

6. A method according to claim 4, wherein each of the plurality of items of data has an ingestion marker of the one or more ingestion markers associated therewith and transmitted with the request, and wherein data received during said receiving step includes only items of data having an associated ingestion marker different than the first associated ingestion marker transmitted with the request.

7. A method according to claim 1, wherein the data is Electronic Program Guide (EPG) data, each of the plurality of items of data is program metadata, wherein the plurality of items is defined as a view set and is limited with respect to at least one of channel, day, and time slot.

8. A method according to claim 7, further comprising the step of identifying favorite channels and most frequently watched channels based on viewer usage statistics, wherein the view set is limited to at least one of a set of favorite channels and a set of channels identified as most frequently watched channels based on viewer usage statistics.

9. A method of making Electronic Program Guide (EPG) data available to a population of set top boxes via electronic communications over a network of a service provider of terrestrial, cable or satellite digital television, comprising the steps of:

obtaining a current complete set of EPG data for a rolling window of a predetermined number of days from at least one source;

comparing the current complete set of EPG data obtained during said obtaining step to a most-recent complete set of EPG data stored in memory to identify changes in items of the most-recent EPG data stored in memory relative to the current complete set of EPG data obtained during said obtaining step, each of the items of EPG data stored in memory including an ingestion marker representing a last occurrence of when a change was made to the item of EPG data in memory; and updating the items of EPG data stored in memory with the changes identified during said comparing step and updating the ingestion marker associated with each of the items of EPG data changed to indicate that a change was made corresponding to said obtaining step;

wherein said obtaining, comparing and updating steps are performed by at least one web-server connected to the network, wherein the EPG data includes information concerning scheduled programs within the rolling window and wherein, for each scheduled program, the items of data include channel information, title information, date information, time slot information, and metadata concerning the scheduled program.

10. A method according to claim 9, further comprising the steps of:

receiving a request from a client device for EPG data, the request including a first one of one or more ingestion markers associated with items of EPG data being requested; and transmitting via a transfer protocol to the client device only EPG data having at least one associated ingestion marker different than the first associated ingestion marker transmitted with the request.

11. A method according to claim 10, wherein the EPG data transmitted during said transmitting step is transmitted via a unicast transmission across the network from the at least one web-server to the client device from which the request was received, and wherein the transfer protocol is Hyper-Text Transfer Protocol (HTTP).

12. A system of acquiring and accumulating Electronic Program Guide (EPG) data from a web-server over a network, comprising:

a client device having cache memory in which program metadata and an associated first of one or more ingestion markers associated with the program metadata are stored for each program in the EPG data within a rolling window of days of scheduled programs, each of said first ingestion markers representing a last occurrence of when a change was made to the program metadata associated with said first ingestion marker;

said client device having at least one module for performing a Hyper-Text Transfer Protocol (HTTP) fetch of program metadata having a different ingestion marker than the first ingestion marker stored in the cache memory and for updating the program metadata in cache memory for each program having a different ingestion marker obtained with the HTTP fetch, wherein the program metadata includes channel information, title information, date information, time slot information, and other metadata concerning the scheduled program, wherein the client device is a set top box, and wherein the network is a network of a service provider of terrestrial, cable or satellite digital television.

13. A system according to claim 12, wherein the HTTP fetch is limited to a subset of a set of data stored in the cache memory of the client device, and wherein the subset comprises a view set having a single ingestion marker associated therewith.

14. A system according to claim 12, wherein program metadata obtained by the HTTP fetch consists only of program metadata having an associated ingestion marker different than the first associated ingestion marker stored in cache memory.

15. A system according to claim forming 12, wherein the program metadata subject to the HHTP fetch is defined as a view set and is limited with respect to at least one of channel, day, and time slot.

16. A method according to claim 15, wherein the view set is limited to at least one of a set of favorite channels and a set of channels identified by the client device based on viewer usage statistics.

* * * * *